United States Patent [19]

James

[11] Patent Number: 4,558,404

[45] Date of Patent: Dec. 10, 1985

[54] ELECTROSTATIC PRECIPITATORS

[75] Inventor: Barry K. James, Solihull, England

[73] Assignee: Dresser Industries, Inc., Dallas, Tex.

[21] Appl. No.: 486,632

[22] Filed: Apr. 20, 1983

[30] Foreign Application Priority Data

Apr. 22, 1982 [GB] United Kingdom ................. 8211635

[51] Int. Cl.[4] ............................................. H02P 13/24

[52] U.S. Cl. ........................................ 363/37; 363/68; 323/903; 315/209 CD; 55/105

[58] Field of Search .................... 363/37, 68; 323/903; 55/101, 105; 315/209 CD; 307/252 L, 252 M

[56] References Cited

U.S. PATENT DOCUMENTS

| | | | |
|---|---|---|---|
| 3,443,358 | 5/1969 | Drenning et al. | 323/903 |
| 3,596,133 | 7/1971 | Warren et al. | 315/209 CD |
| 4,084,221 | 4/1978 | Ogata | 363/68 |
| 4,296,358 | 10/1981 | Bernier | 315/209 CD |
| 4,308,494 | 12/1981 | Gelfand et al. | 323/903 |
| 4,367,418 | 1/1983 | Faust et al. | 363/68 |
| 4,485,428 | 11/1984 | Harris | 323/903 |

FOREIGN PATENT DOCUMENTS

| | | |
|---|---|---|
| 0034075 | 8/1981 | European Pat. Off. . |
| 0884534 | 12/1961 | United Kingdom . |
| 1083788 | 9/1967 | United Kingdom . |
| 1154072 | 6/1969 | United Kingdom . |
| 1173270 | 12/1969 | United Kingdom . |
| 1425987 | 2/1976 | United Kingdom . |
| 1440003 | 6/1976 | United Kingdom . |
| 1483679 | 8/1977 | United Kingdom . |
| 2000919 | 1/1979 | United Kingdom . |
| 2004426 | 3/1979 | United Kingdom . |
| 1544105 | 4/1979 | United Kingdom . |
| 1551728 | 8/1979 | United Kingdom . |
| 2028606 | 5/1980 | United Kingdom . |
| 1581763 | 12/1980 | United Kingdom . |
| 1582194 | 12/1980 | United Kingdom . |
| 2075759 | 11/1981 | United Kingdom . |
| 2074805 | 11/1981 | United Kingdom . |

*Primary Examiner*—Peter S. Wong
*Assistant Examiner*—Anita M. Ault
*Attorney, Agent, or Firm*—Daniel Rubin

[57] ABSTRACT

A circuit for applying unidirectional pulses to a precipitator, in addition to a base d.c. level supplied by a transformer/rectifier set, includes a rectifier, an inverter and a transformer/rectifier set connected to charge a storage capacitor. Discharge of the capacitor into the precipitator is controlled by a chain of unidirectionally conducting devices (thyristors as shown) which are simultaneously triggered at the desired voltage at the capacitor. In other embodiments breakover diodes are used instead of the thyristors.

3 Claims, 7 Drawing Figures

ELECTROSTATIC PRECIPITATORS

This invention is concerned with a circuit for supplying voltage pulses to an electrostatic precipitator, the pulses being superimposed on a base voltage level supplied independently.

It has been found advantageous in dealing with certain kinds of dust to provide electrostatic precipitators with high voltage pulses in addition to a substantially steady voltage supplied by conventional and well known means.

It is an object of the present invention to provide circuits for supplying such voltage pulses to an electrostatic precipitator.

The present invention is a circuit for supplying voltage pulses to an electrostatic precipitator and comprising a storage capacitor, means for charging the storage capacitor to the desired pulse voltage, unidirectionally conducting means coupled to the storage capacitor and adapted to be coupled with the precipitator and control means for rendering conductive the unidirectionally conducting means to connect the capacitor to the precipitator.

Embodiments of the present invention will now be described, by way of example, with reference to the accompanying drawings, in which.

Figure 1:
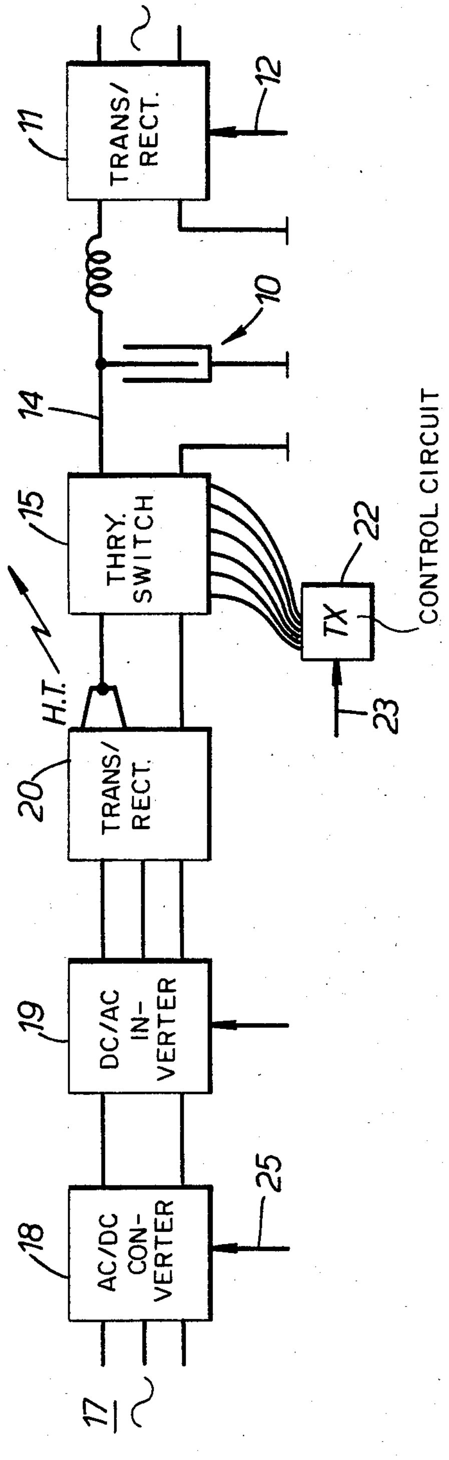
FIG. 1 is a block circuit diagram of a first embodiment of an electrical supply system for an electrostatic precipitator according to the present invention.

Referring now to FIG. 1, an electrostatic precipitator 10 is supplied with a d.c. base voltage level by means of a conventional transformer rectifier set 11, the voltage level being controlled as necessary as indicated at 12. In addition, the rectifier is supplied with voltage pulses on line 14 from a thyristor switch 15 which is in turn supplied from the mains 17 through an a.c. to d.c. converter 18, an inverter 19 and a transformer rectifier set 20 connected in cascade. The thyristor switch 15 is triggered by a control circuit 22 having a control input 23. The frequency of the signal at input 23 determines the frequency of the voltage pulses on line 14 while the amplitude of the pulses is determined by the input 25 to the a.c./d.c. converter 18.

Figure 2:
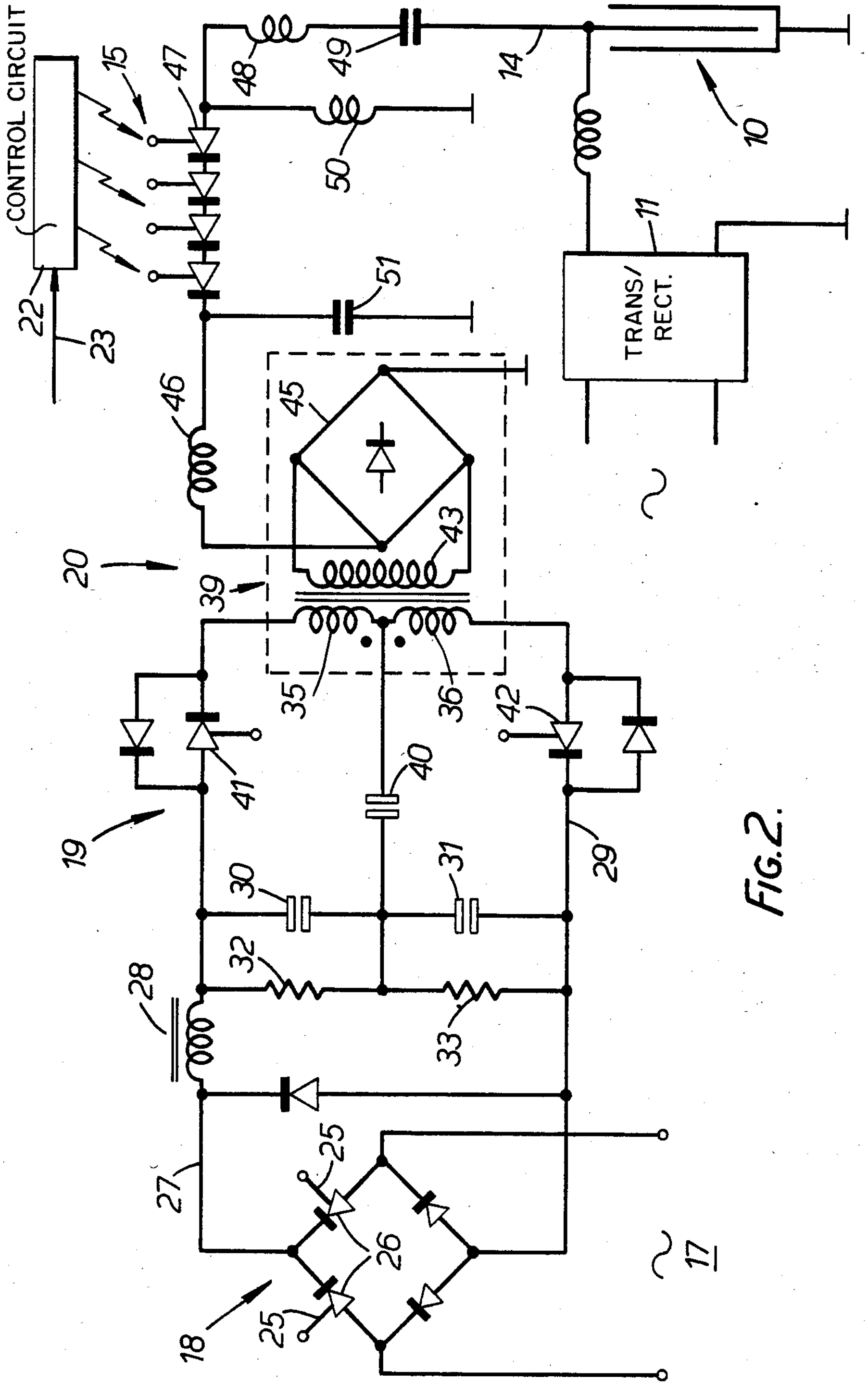
FIG. 2 is a more detailed circuit diagram of the embodiment of FIG. 1.

Referring now to FIG. 2, the converter 18 is in the form of a simple bridge rectifier which supplies the inverter 19 through a coil 28. The two rectifiers 26 supplying the positive output line 27 of the bridge are controlled rectifiers to the gates of which are supplied the signals 25.

The inverter 19 comprises two capacitors 30 and 31 connected in series between the positive and negative lines 27 and 29, two resistors 32 and 33 similarly connected, a thyristor connecting each of the lines 27 and 29 to the ends of primary windings 35 and 36 respectively of the transformer 39 in the set 20 and a capacitor 40 connecting the midpoints of the resistors 32, 33 and capacitors 30, 31 to the common point of the windings 35 and 36. It should be noted that the windings 35 and 36 are wound in opposite senses.

The thyristors 41 and 42, each with a diode in reverse parallel relation, control the frequency of discharge of the capacitor 40 through the windings 35 and 36 while the amplitude of each discharge is determined by the voltage built up on capacitors 30 and 31, this voltage being in turn dependent on the conducting time of the thyristors 26 controlled by the signals 25. Thus the frequency and amplitude of high voltage pulses at the secondary winding 43 of the transformer 39 are controlled.

Connected to the output of the secondary winding 43 in the transformer/rectifier set 20 is a bridge rectifier 45, the positive terminal of which is earthed and the negative terminal of which is connected through an inductor 46 to the negative terminal of a chain 47 of unidirectional conducting devices, in this embodiment eighty thyristors, the positive terminal of the chain being connected through an inductor 48 and capacitor 49 in series to the negative side of the precipitator 10. An inductor 50 and storage capacitor 51 connect to earth the positive and negative terminals respectively of the thyristor chain 47. In this way the output pulses from the bridge rectifier 45 charge the capacitor 51 which is discharged into the precipitator when the thyristor chain 47 conducts under the control of the circuit 22.

Figure 3:
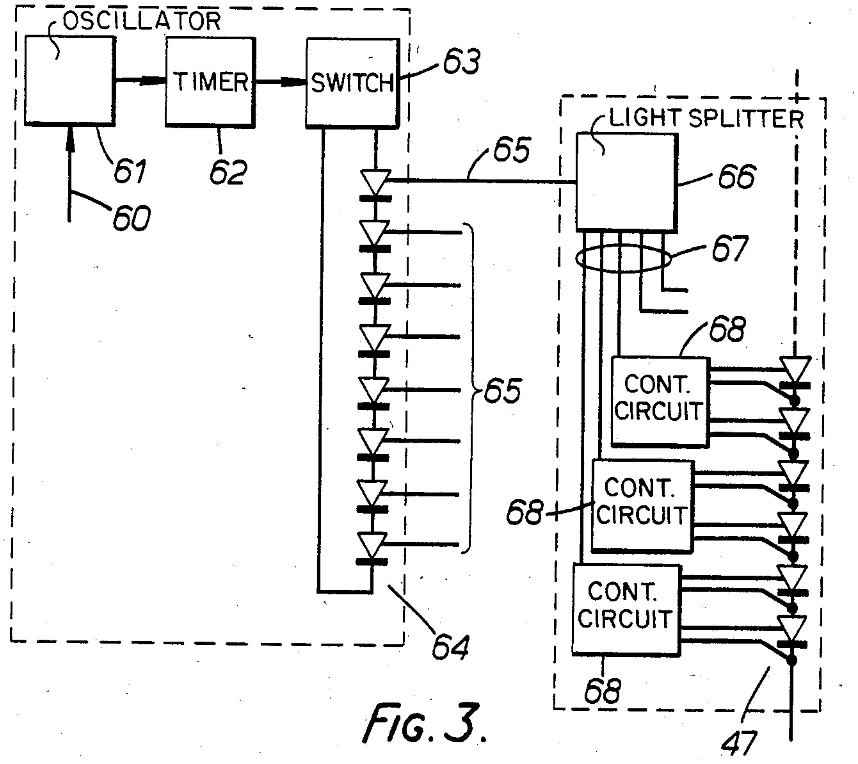
FIG. 3 shows more detail of part of FIG. 2.

To avoid overloading any thyristor in the chain 47 it is necessary to ensure that all the thyristors in the chain are rendered conducting at the same instant and the control circuit 22 for achieving this is shown in more detail in FIG. 3.

The signal 60 determining the firing rate of the thyristor chain 47 is supplied to a voltage controlled oscillator 61 which feeds a timer 62 which in turn triggers a power switch 63 to pulse a chain 64 of eight light emitting diodes. Each diode is viewed by a respective optical fibre 65 and each fibre 65 passes to an optical light splitter 66 where the light pulse is split five ways. Five output fibres 67 each connects to a respective control circuit 68 each of which controls the firing of two thyristors in the chain 47. It can be seen that the forty light pulses on the fibres 67 from the eight light splitters 66 are simultaneous and in FIG. 4 is shown one of the control circuits 68 which each receive a pulse on a fibre 67 and control the firing of two thyristors in the chain 47.

Figure 4:
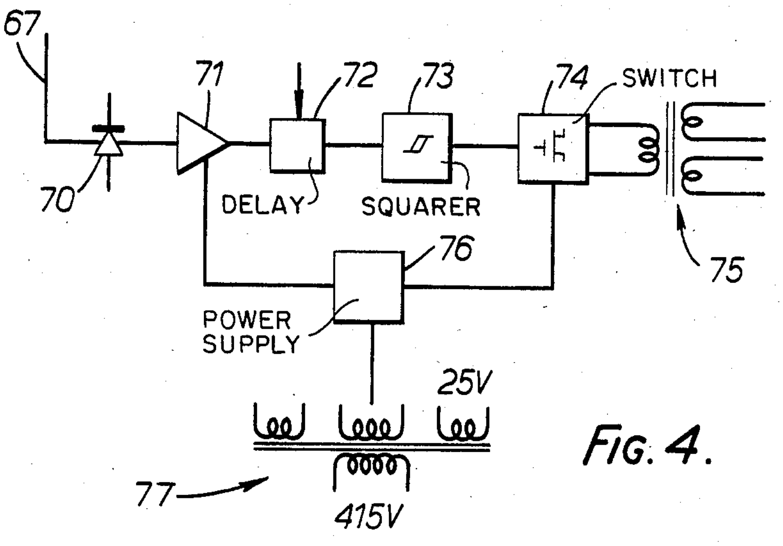
FIG. 4 shows further detail of part of FIG. 3.

Referring to FIG. 4, the incoming fibre 67 illuminates a detector 70 which provides an electrical signal to an amplifier 71 whose output is delayed at 72, squared at 73 and then used to trigger a VMOS power switch 74 whose output energises the primary winding of a pulse transformer 75 having two secondary windings each connected to trigger one thyristor in the chain 47. The power supply for the amplifier 71, delay 72, squarer 73 and the switch 74 is supplied from one of 40 secondary windings of a transformer 77. The delay introduced at 72 is adjustable to match the firing of the two thyristors with the firing of the other seventy-eight thyristors in the chain 47.

The overall performance of the circuit of FIG. 1 can be controlled to provide to the precipitator pulses that can be controlled as to amplitude, frequency and duration to suit the operational requirements of the precipitator. Test results to date suggest that optimum results are achieved by reducing the d.c. level supplied by the transformer/rectifier set by about 10% compared with conventional d.c. operation and using pulses of amplitude equally as high again, of a duration of about 100 μs and at a frequency of about 50 p.p.s.

Figure 5:
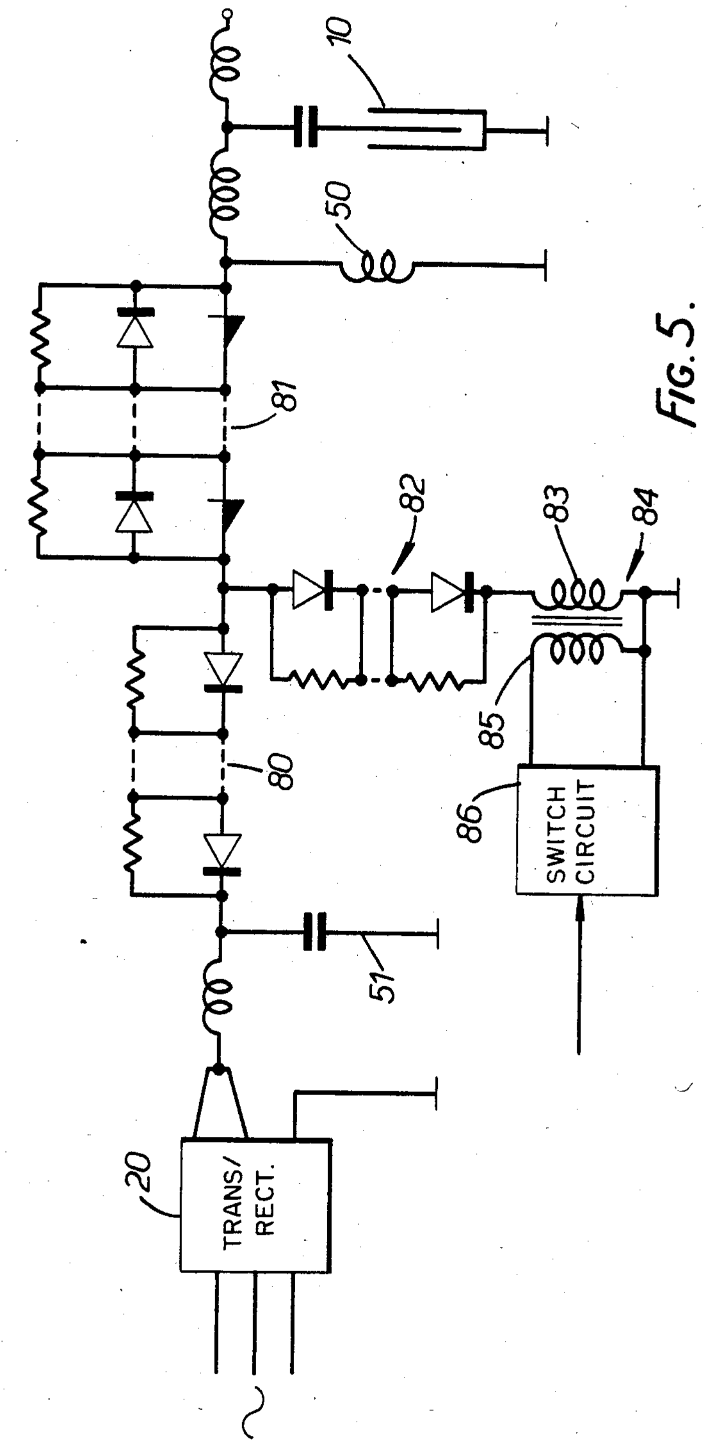
FIG. 5 is a detailed circuit diagram of part of a second embodiment of the present invention.

In FIG. 5 is shown a modified embodiment in which the thyristor switch 15 of FIG. 1 is replaced by a chain of breakover diodes which have a fixed breakover voltage of say 1000 V the characteristic otherwise being similar to that of a thyristor.

The output of the transformer/rectifier set 20 is again supplied through an inductor to the storage capacitor 51 and to a chain 80 of more than eighty diodes, each having a parallel connected resistor, a chain 81 of eighty breakover diodes, each having parallel connected resistors and diodes to ensure overvoltage protection, and the precipitator 10 itself. As so far described the circuit would remain inoperative until the capacitor 51 had charged to something over 80 KV, so there is also provided a control circuit comprising a chain 82 of diodes, each with a parallel resistor, in series with the secondary winding 83 of a transformer 84, the primary winding 85 of the transformer being pulsed at the desired frequency through a thyristor switch circuit 86. The chain 80 of diodes is provided to isolate the capacitor 50 from the anode of the chain 82. In this way the positive end of the diode chain 82 is driven negative with each pulse, the chain conducts and the negative pulse is applied to the positive end of the chain 81 of breakover diodes which then conduct to connect the capacitor 51 to the precipitator 10. Thus the frequency of pulses at the precipitator 10 is controlled by the frequency of the control pulses to the switch 86.

Figure 6:
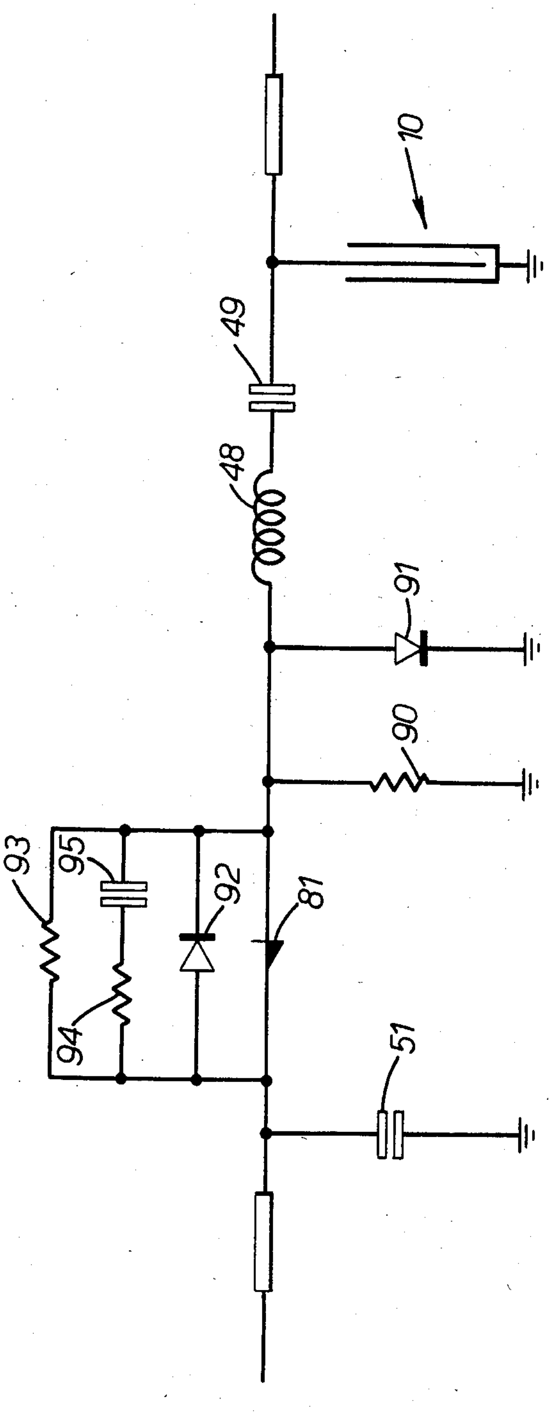
FIG. 6 is a circuit diagram of a modification of the embodiment of FIG. 5.

In a modification of the FIG. 5 embodiment, the breakover diode circuit is changed as indicated in FIG. 6. Only one breakover diode 81 is shown and it should also be understood that circuits are provided for triggering conduction of the diodes 81. The important changes in FIG. 6 as compared with FIG. 5 are the replacement of the inductance 50 of FIG. 5 by the parallel combination of a resistor 90 and diode 91, the diode 91 having its anode earthed. Also, connected in parallel with the breakover diode 81, besides the reverse connected diode 92 and resistor 93, is the series combination of a resistor 94 and capacitor 95.

The operation of FIG. 6 is as follows. Initially the capacitor 51 is charged by the transformer/rectifier set 20 through earth. When the breakover diodes conduct the capacitor 51 discharges into the precipitator 10 giving the desired negative pulse. It should be noted that the resistance of resistor 90 is sufficiently high that the discharge of the capacitor 51 is not short circuited by the resistor 90.

As the precipitator is in effect a capacitor it has now been charged and it discharges through the circuit comprising earth, the capacitor 51, diode 92, inductor 48 and capacitor 49, thus largely restoring to the capacitor 51 the energy that has been taken from it. The diode 91 acts to clamp the negative terminal of capacitor 51 during release of inductive energy stored in the inductor 48. The capacitor 95 and resistor 94 act to snub and control the rate of change of the voltage across the inductor.

Figure 7:
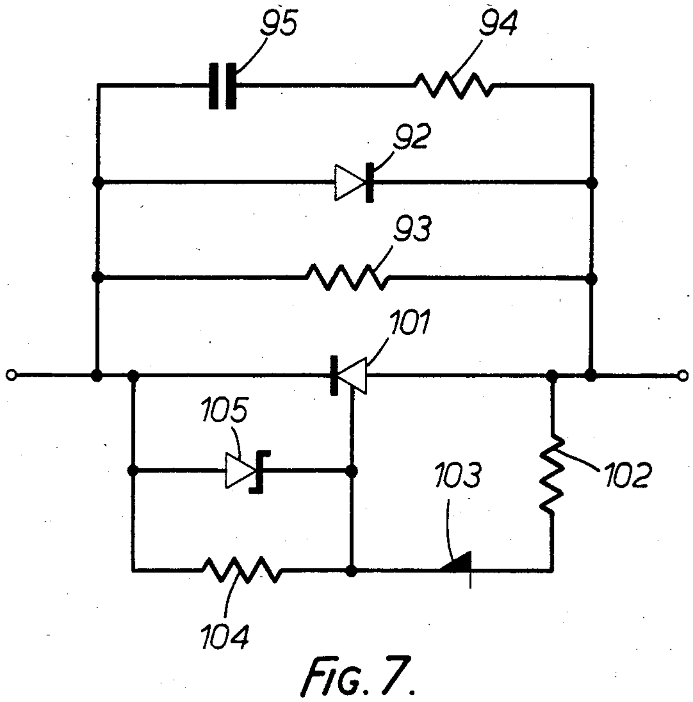
FIG. 7 is a further modification of the embodiment of FIG. 6.

In a modification of the FIG. 6 embodiment, higher power levels may be accommodated by using breakover diodes in the gate circuits of thyristors to control the firing thereof, this modification being shown in FIG. 7. With reference to FIG. 6 each of the breakover diodes 81 (and its associated diode and resistor) is replaced by a thyristor 101 having in its cathode gate circuit the series connection of a resistor 102 and a breakover diode 103, while its gate is connected to the anode through a resistor 104 and a zener diode 105 connected in parallel.

The embodiments described so far have assumed separate supplies for the base d.c. level and for the pulses, but it would also be possible to use the transformer/rectifier set which supplies the base d.c. level to energise the thyristor switch 15 of FIG. 1 or by the breakover diode chain of FIG. 5.

I claim:

1. A circuit for supplying voltage pulses to an electrostatic precipitator and comprising a storage capacitor, means for charging the storage capacitor to the desired pulse voltage, a chain of thyristors coupled to the capacitor and adapted to be coupled with the precipitator, and control means for rendering conductive the chain of thyristors to connect the capacitor to the precipitator, said control means including a chain of light emitting diodes, light transmitting means including optical light splitters, control circuits, each of which simultaneously receives a light pulse from said light transmitting means to trigger the thyristors in the chain simultaneously and optical fibres extending between said light emitting diodes and said optical light splitters and between the optical light splitters and said control circuits.

2. A circuit for supplying voltage pulses to an electrostatic precipitator and comprising a storage capacitor, means for charging the storage capacitor to the desired pulse voltage, a chain of thyristors coupled to the capacitor and adapted to be coupled with the precipitator, and control means for rendering conductive the chain of thyristors to connect the capacitor to the precipitator, each thyristor having a breakover diode connected between its cathode and its gate with its gate being connected to its anode through the parallel connection of a resistor and a zener diode and its cathode being connected to its anode through the parallel connections of a resistor and capacitor, a reverse connected diode, and a resistor.

3. A circuit for supplying voltage pulses to an electrostatic precipitator to which a base voltage level is independently supplied, comprising a storage capacitor and a chain of unidirectional conducting devices comprising a chain of thyristors connected in series with the precipitator through a coupling capacitor, each of said thyristors having a breakover diode connected between its cathode and its gate with its gate being connected to its anode through the parallel connection of a resistor and a zener diode and with its cathode being connected to its anode through the parallel connections of a resistor and capacitor, a reverse connected diode, and a resistor, an impedance connected across the series combination of the storage capacitor and said chain, means for charging the storage capacitor to the desired pulse voltage, and control means for rendering conductive simultaneously the devices in said chain to connect the storage capacitor with the precipitator.

* * * * *